(No Model.)

J. N. DAVIS.
MACHINE FOR CLEANING COTTON.

No. 267,501. Patented Nov. 14, 1882.

WITNESSES:

INVENTOR:
J. N. Davis
BY
ATTORNEYS.

UNITED STATES PATENT OFFICE.

JOHN NESBIT DAVIS, OF WALKERSVILLE, ASSIGNOR TO R. P. DAVIS, OF MONROE, NORTH CAROLINA.

MACHINE FOR CLEANING COTTON.

SPECIFICATION forming part of Letters Patent No. 267,501, dated November 14, 1882.

Application filed March 18, 1882. (No model.)

*To all whom it may concern:*

Be it known that I, JOHN NESBIT DAVIS, of Walkersville, in the county of Union and State of North Carolina, have invented a new and Improved Machine for Cleaning Cotton, with or without the seed in it, of which the following is a full, clear, and exact description.

The object of my invention is to facilitate the removal of dirt and trash from cotton with or without seed in it.

Reference is to be had to the accompanying drawings, forming part of this specification, in which similar letters of reference indicate corresponding parts in both the figures.

Figure 1:
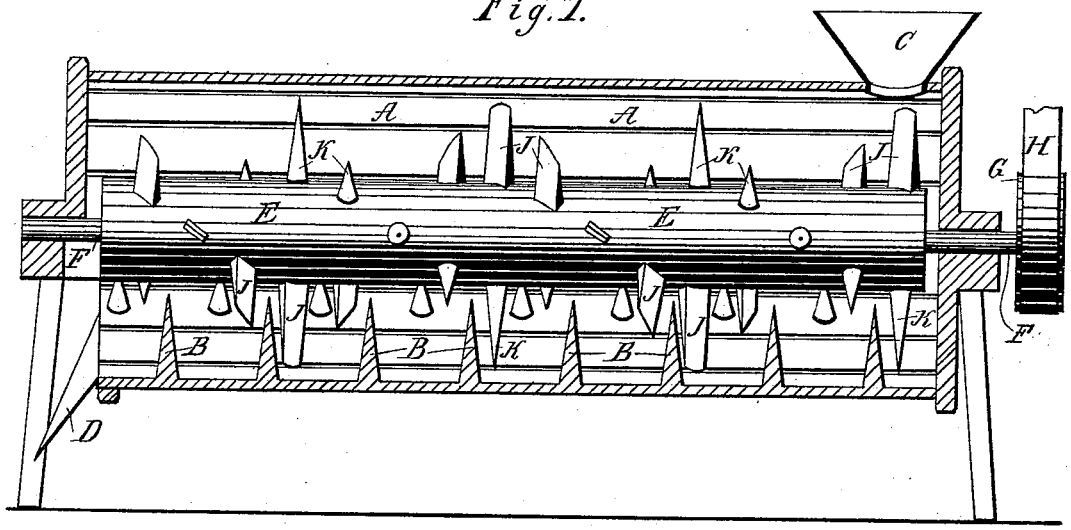
Figure 2:
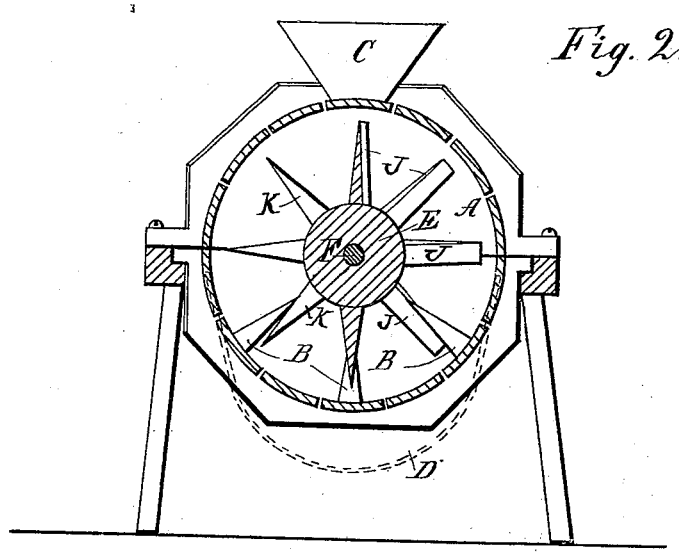

Figure 1 is a longitudinal sectional elevation of my improved machine for cleaning cotton with or without seed in it. Fig. 2 is a cross-sectional elevation of the same.

A hollow cylinder, A, is made of slats, lattice-work, or wire-netting, and is provided on its bottom with a series of inwardly-projecting spikes, wings, or blades, B. This cylinder is provided at one end, on top, with a funnel or hopper, C, and at the opposite end, at the bottom, with a discharge-spout, D. A cylinder, E, is mounted on a shaft, F, passing longitudinally through the cylinder, and journaled in the ends of the same. This shaft F is provided at one end with a belt-pulley, G, over which a belt, H, passes. The cylinder E is provided with a spiral row of wings or blades, J, and with a spiral row of spikes or pegs, K. When the cylinder E is rotated the spikes K and blades or wings J pass in between the pegs or spikes B.

The cotton, before or after it is passed through the gin, is placed in the hopper or funnel C, and from there drops into the cylinder A. The pegs or spikes K and the wings or blades J throw the cotton about in the cylinder A and carry it toward the opposite end of the cylinder to the spout D, through which the cotton passes from the cylinder. The sand, dirt, leaves, trash, &c., drop through the openings in the cylinder A. By means of this machine large quantities of cotton can be cleaned very thoroughly in a very short time. The machine is of very simple construction, and cannot easily get out of order.

Having thus fully described my invention, what I claim as new, and desire to secure by Letters Patent, is—

A rotary cylinder, provided with alternating spiral rows of blades J and spikes K, in combination with a surrounding slotted cylinder, A, having a periphery formed of inwardly-spiked slats set at some distance apart, a hopper at the upper part of one end of said cylinder and a discharge-spout at the lower end thereof, as shown and described.

JOHN NESBIT DAVIS.

Witnesses:
ALEX. W. KLUTTZ,
R. G. DAVIS.